United States Patent [19]

MacInnes et al.

[11] 3,969,804
[45] July 20, 1976

[54] BEARING HOUSING ASSEMBLY METHOD FOR HIGH SPEED ROTATING SHAFTS

[75] Inventors: Hugh MacInnes, La Canada; Paul M. Uitti, Huntington Beach, both of Calif.

[73] Assignee: Rajay Industries, Inc., Long Beach, Calif.

[22] Filed: Apr. 14, 1975

[21] Appl. No.: 567,857

Related U.S. Application Data

[62] Division of Ser. No. 428,832, Dec. 27, 1973, Pat. No. 3,941,437.

[52] U.S. Cl. .............................. 29/156.4 R; 29/469; 417/407
[51] Int. Cl.² ..................... B23P 15/00; F04B 17/00
[58] Field of Search .............. 29/156.4 R, 434, 463, 29/469, DIG. 10; 308/121, 134.1, 78; 417/405, 406, 407

[56] References Cited
UNITED STATES PATENTS

| | | | |
|---|---|---|---|
| 1,717,817 | 6/1929 | Sykes | 29/434 |
| 2,646,210 | 7/1953 | Kohlmann et al. | 417/407 |
| 3,043,636 | 7/1962 | MacInnes et al. | 308/121 |
| 3,056,634 | 10/1962 | Woollenweber, Jr. et al. | 308/121 |
| 3,058,787 | 10/1962 | Bernson | 308/121 |
| 3,176,620 | 4/1965 | Shiley | 417/407 |
| 3,411,706 | 11/1968 | Woollenweber, Jr. et al. | 308/121 |

*Primary Examiner*—C. W. Lanham
*Assistant Examiner*—Dan C. Crane
*Attorney, Agent, or Firm*—Cox, Smith, Smith, Hale & Guenther Incorporated

[57] ABSTRACT

A bearing housing for high speed rotating shafts wherein the bearing housing is constructed in two parts with the bearing being of the semi-floating type. One part of the bearing housing presses against the bearing to resist any axial thrust that may be exerted on the bearing during high speed operation. The bearing is floating on a lubricant around its outer diameter in the other portion of the two part bearing housing. With the bearing being stationary in the housing, the only critical surface becomes the internal surface between the bearing and the shaft itself. By varying the position of the two parts of the bearing housing, the passage for the lubricant to enter the bearing housing can be located at a near vertical position while permitting desired orientation of the end of the bearing housing.

4 Claims, 10 Drawing Figures

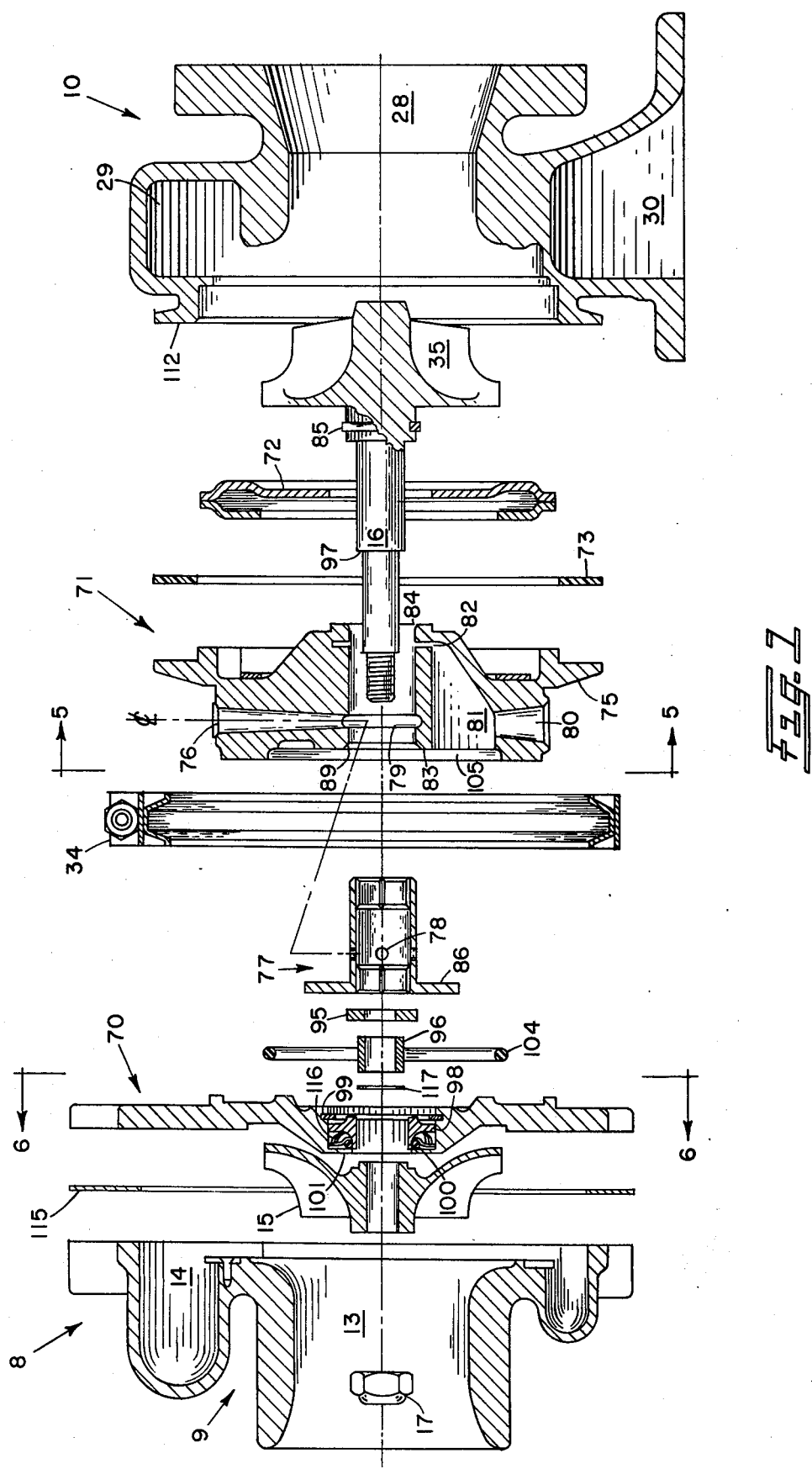

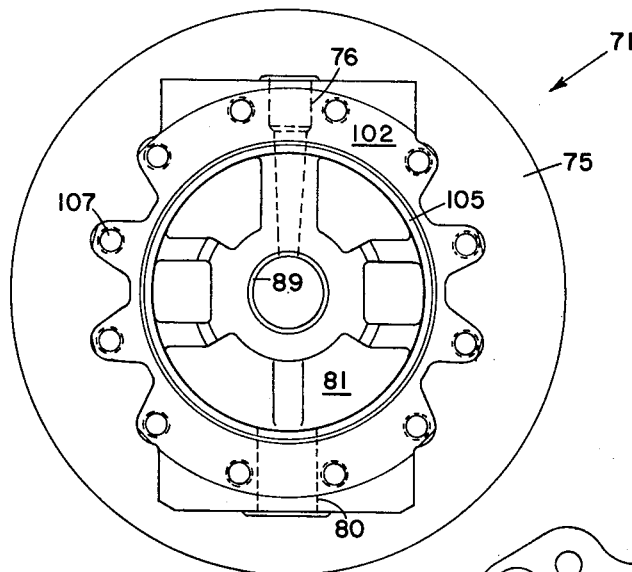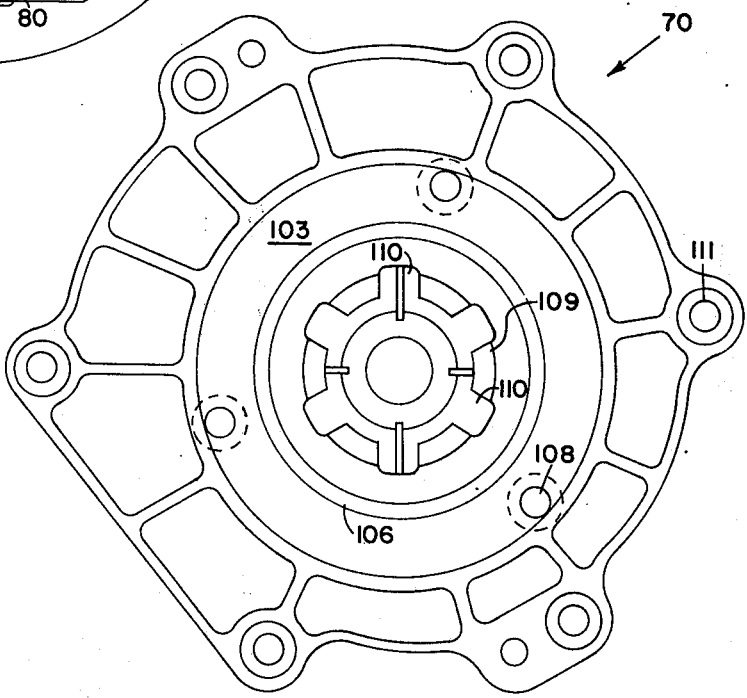

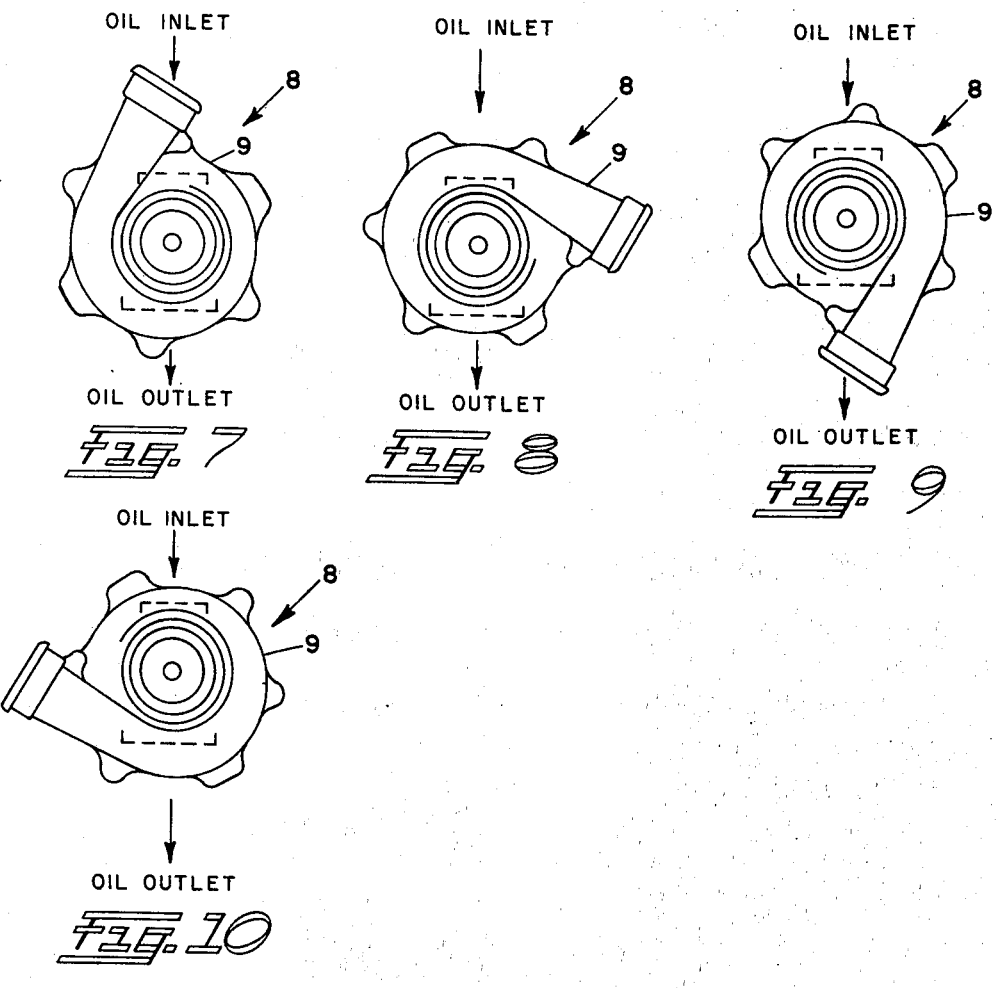

BEARING HOUSING ASSEMBLY METHOD FOR HIGH SPEED ROTATING SHAFTS

This is a division, of application Ser. No. 428,832 filed Dec. 27, 1973, now U.S. Pat. No. 3,941,437.

BACKGROUND OF THE INVENTION

The invention relates to bearing housing means and is more particularly directed to improved means for providing stationary sleeve bearings and bearing housings for shafts rotating at high speeds.

The present invention was designed and developed in conjunction with bearings and bearing housings required for high speed rotating shafts in turbochargers. In the production and manufacturing of the bearing housing, it previously had to be sand cast with numerous tapped and machined surfaces being cut therethrough. By dividing the bearing housing into two separate parts, the bearing housing may be die cast with little, if any, need for further machining. An inexpensive axial thrust seal may now be incorporated in the bearing housing with a substantial reduction in cost. Die casting the housing itself is much more economical than the former method of sand casting.

BRIEF DESCRIPTION OF THE PRIOR ART

This invention is an improvement over U.S. Pat. No. 3,043,636 issued on July 10, 1962 to one of the same inventors as the present application which is hereby incorporated by reference.

In the early development of high speed rotating shafts the bearings and bearing housings were normally water cooled. As the small high speed devices became further refined, air cooled housings were developed wherein the major portion of the cooling was received from the lubricating oil. However, oil adjacent to a lightly loaded high speed rotating shaft would cause the phenomenon of oil whirl. In oil whirl the shaft center rotates in the same direction as the shaft but at about half the rotational speed around a varying axis different from the bearing center. This additional rotation often assumes a cardioid path. Oil whirl, particularly in high speed lightly loaded shafts, could wipe out a bearing in a matter of minutes. One method of preventing this was to make the shaft journals extremely hard, extremely smooth and balance the rotating group as a unit to very close tolerances.

Since these early developments, fixed bearings have been replaced with floating bearings in an effort to prolong the bearing life. The bearings would fit into the bearing housing with about the same clearance as the journals fit into the bearings. The bearings are free to rotate and actually float between the journal and the bearing housing. In addition to giving much longer bearing life, floating bearings do not require journals as hard or as smooth as previously required and they have the built-in ability to dampen vibrations, thereby making it unnecessary to balance the entire unit as a group. Therefore, one portion could be replaced without replacing the entire unit.

However, the floating bearing, as originally developed, would not accept thrust along the axis of the shaft. Therefore, a semi-floating bearing was developed wherein a flange on one end of the bearing is anchored by means of a pin or other suitable device to the bearing housing and the bearing is no longer free to rotate. By the use of a snap ring or other snugly fitting device, the bearing may now accept an axial thrust along the axis of the shaft.

Since some lubricant is required with either a floating or a semi-floating bearing, they must have tapped holes for the inward and outward flow of the lubricant. This is normally a standard lubricating oil used in the crankcase of an engine. With the flow of the oil through the bearing housing and around the bearing itself, a somewhat expensive seal had to be developed to prevent the leakage of the oil along the direction of the axial thrust. Because this area was periodically exposed to a vacuum conditioned by the compressor, a potential leakage path existed. Also, the bearing housing had to be sand cast to provide the many cavities required therein. With the sand casting method of production, a large amount of machining was required to provide good rotating surfaces and seals.

The foregoing problems are contained in the U.S. Pat. No. 3,043,636 incorporated by reference. A further explanation of the background can be found in a book entitled "How to Select and Install Turbochargers" by Hugh MacInnes published by H. P. Books, P.O. Box 50640, Tucson, Arizona 85703, having a Library of Congress Catalog Card No. 70-173701.

SUMMARY OF THE INVENTION

The present invention provides the simplest and most economic bearing housing for high speed rotating shafts using a semi-floating axial thrust bearing. All surfaces of the bearing housing are now visible from the external portion so that a die cast process may now be used. By die casting the compressor end of the bearing housing, the thrust seal may be made much smaller, and more reliable and economical.

Therefore, it is an object of the present invention to provide an improved bearing housing for a high speed rotating shaft.

It is a further object of the present invention to provide a bearing housing for a high speed rotating shaft that can be economically manufactured by such methods as die casting.

It is still a further object of the present invention to provide a high speed bearing housing with an improved sealing means along the direction of the axial thrust of a semi-floating type bearing.

It is an even further object of the present invention to provide an improved design to a semi-floating type bearing for high speed rotating shafts.

It is still another object of the present invention to provide a high speed bearing housing that may be mounted at any position relative to the stationary mount whereby the lubricating oil will continue to flow therethrough by the force of gravity.

It is even another object of the present invention to provide a high speed bearing housing and bearing whereby the lubricating oil will flow over the bearing and shaft and back to its reservoir through the action of gravity without consideration of the position of the turbine housing or compressor housing.

BRIEF DESCRIPTION OF THE DRAWINGS

FIG. 1 is a longitudinal section view of an assembly drawing illustrating a device using the present invention.

FIG. 2 is a longitudinal cross sectional view of the bearing shown in FIG. 1.

FIG. 3 is a front view of the bearing shown in FIG. 2.

FIG. 4 is a cross sectional view of FIG. 2 along section lines 4—4.

FIG. 5 is a view of the turbine portion of the bearing housing shown along lines 5—5 of FIG. 1.

FIG. 6 is a view of the compressor portion of the bearing housing shown along lines 6—6 of FIG. 1.

FIGS. 7-10 illustrate the flow of the lubricating oil with respect to the various mounting positions of the compressor housing.

DESCRIPTION OF THE PREFERRED EMBODIMENT

While the novelty of the present invention is herein described in conjunction with its application to turbochargers, it should be understood that the present invention would apply to any invention using high speed rotating shafts.

Since the present invention has incorporated by reference U.S. Pat. No. 3,043,636, and the drawings of the incorporated reference and the present invention are somewhat similar, identical numbers used in the incorporated reference will be used in the present invention without the need of detailed description with this invention. Since the numbers used on the incorporated reference go through number 64, the present invention will start with number 70 to designate new components to avoid the possibility of confusion.

As a general background discussion, FIG. 1 shows a turbocharger designated generally by the reference numeral 8, having three major sections, the compressor section 9, the turbine section 10 and a shaft housing section that is divided into a compressor portion 70 and a turbine portion 71. The compressor section 9 is secured to the compressor housing portion 70 by a suitable means such as screws (not shown). The compressor section 9 is provided with a fluid inlet 13 and annular discharge passage 14. A compressor impeller 15 is mounted on shaft 16, which is common with the turbine impeller means 35. The compressor impeller 15 is secured to the shaft 16 by means of a nut 17.

The turbine section 10 includes an inlet 30 and an annular inlet passage 29 which communicates with the discharge outlet 28. A heat shield 72 prevents the heat of the exhaust of an engine driving the impeller 35 from overheating the turbocharger. The turbine portion 71 of the housing is secured to the turbine section 10 by any suitable means, such as clamp 34. The turbine housing portion 71 has a flange 75 that can be secured in clamp 34 to flange 112 of the turbine section 10. A seal 73 between the turbine portion 71 of the housing and the turbine section 10 prevents the leakage of any exhaust to the atmosphere.

Inlet passage 76 allows a suitable lubricant such as oil to flow through the turbine housing portion 71 to the bearing 77. The oil is further communicated to shaft 16 through holes 78 in the bearing 77. Annular groove 79 is in line with hole 78 and inlet passage 76 as demonstrated by the center line CL. Oil entering inlet passage 76 is discharged through discharge outlet 80 by means of cavity 81. The oil drains to cavity 81 by means of passage 82 and around butting surface 83 of turbine housing portion 71 and the flange 86 of bearing 77. Lip 84 of turbine housing portion 71 mates with shaft seal 85 to prevent the flow of oil into the turbine section 10 and to prevent the fluid medium, normally hot exhaust fumes, from flowing to the bearing housing section. The butting surface 83 of the turbine housing portion 71 abuts the inner portion of flange 86 on bearing 77.

Before describing the compressor housing portion 70, a further look at the bearing 77 is appropriate. Referring now to FIGS. 2, 3 and 4 in combination with the assembly drawing shown in FIG. 1, a better understanding of the bearing 77 can be obtained. There is a cylindrical portion 87 and a flange portion 86 of the bearing 77. The previously mentioned holes 78 can be best seen in FIG. 4. The cylindrical portion 87 has a chamfer 88 to permit quick insertion in turbine housing portion 71, which also contains a chamfer 89. The forward part 90 of cylindrical portion 87 extends slightly forward of the flange 86. This forward part 90 has V-shaped grooves 91 cut to allow oil to communicate therethrough because the forward part 90 stops axial thrust that may be exerted on the bearing 77. By flow of oil through the V-shaped grooves 91 into annular groove 113, oil will flow over the front of flange 86 into cavity 81 and out discharge outlet 80. Tabs 92, when mated with turbine housing portion 71, will prevent the rotation of bearing 77. Surfaces 93 have to be very smooth for rotation of the shaft 16, with V-shaped grooves 94 allowing the flow of a lubricant between the bearing and shaft. The lubricant which enters through hole 78, is communicated to a larger diameter part 114 of cylindrical portion 87 for further communication to V-shaped grooves 94. It also travels along cylindrical portion 87, thereby allowing the bearing 77 to float on oil. The internal portion of the bearing 77 must be bored and the grooves 91 cut to provide proper lubrication and a smooth rotating surface 93. The only critical part of the bearing 77 is the portion that rubs on shaft 16 because all other surfaces are fixed relative to the adjacent surface it may touch. The bearing 77 may be die cast to fairly close tolerances and bored out to give the further precision desired. This is much cheaper than the previous methods of machining the entire bearing 77.

Referring back to FIG. 1, washer 95 in conjunction with sleeve 96 combine to take the axial thrust on bearing 77. Washer 95 is pressed between shoulder 97 of shaft 16 and sleeve 96 to prevent any leakage of the lubricating oil through the internal portion of sleeve 96. The compressor housing portion 70 has a seal cartridge 98 that is retained by retaining ring 99. The forward portion of the seal cartridge 98 abuts the washer 95 and the rear of seal cartridge 98 slides through an 0-ring seal 100 and internal flange 101 of compressor housing portion 70. Seal cartridge 98 also presses against a wave spring 116, which holds 0-ring seal 100 between internal flange 101 and the rear of seal cartridge 98 to prevent leakage from the bearing housing to the compressor portion 9 or vice versa. Shims 117 are located between sleeve 96 and compressor impeller 15 to provide spacing and freedom of rotation of the compressor impeller 15.

Referring now to FIGS. 5 and 6, a better understanding of the bearing housing can be obtained. Surface 102 of turbine housing portion 71 is pressed against surface 103 of compressor housing portion 70. When the two are bolted together with an 0-ring 104 being located in mating grooves 105 and 106, oil is held between the two housing portions 70 and 71. By drilling and tapping a number of holes 107 in turbine housing portion 71 and only enough securing holes 108 in compressor portion 70, once turbine section 10 and compressor section 9 have been secured in place, the turbine housing portion 71 can be rotated with respect to the compressor housing portion 70 so that the inlet passage 76 is in the uppermost position. This will allow oil to flow therethrough and out discharge outlet 80 by the simple effect of gravity. Since only a flange 75 and sleeve 34 holds turbine housing portion 71 to turbine section 10, the only restriction would be that the holes 107 must mate with the holes 108. Therefore, the turbine housing portion 71 can be located at twelve separate positions around a circle, to locate the inlet passage 76 in its uppermost position. As a pictorial example of the oil inlet and outlet with respect to the relative position of the compressor, look at FIGS. 7, 8, 9 and 10, which illustrates only four of twelve possible positions. The oil inlet is always located at approximately the uppermost portion, with the oil outlet being located at the bottom to allow the oil to flow simply by the force of gravity. Lugs 109 in compressor housing portion 70 mate with tabs 92 and flange 86 to prevent the axial movement of bearing 77. Also, slots 110 allow the communication of oil to cavity 81 and out discharge outlet 80.

Prior to the present invention, bearing housings were usually made from cast iron, permanent mold cast aluminum or fabricated components. A unique feature of the present design is that the bearing housing may be die cast in aluminum, zinc or other suitable alloy. The advantages of the die casting are low cost and high production made possible by very little need for machining and the simplicity and ease of servicing. The present design is incorporated with the use of a semi-floating bearing and a unique heat shield 72 designed to prevent hot exhaust heat and fumes from reaching other parts of the device.

The heat shield 72 can be stamped from stainless steel or other more suitable substance. Prior to the present design, a solid shield was used that was more expensive and less effective in shielding the bearing housing from hot exhaust fumes.

Die casting is a precision casting, where a device can be made very close to the finished product with very little need for machining or other refinement of the various surfaces. A die cast mold is divided into two halves, with the cavity between the two halves being filled with a desired substance (such as aluminum) that is being cast. All surfaces of the device being cast must be visible from the two halves of the die, so that when the molten substance has hardened the two halves of the die may be removed. By using this method, very smooth surfaces can be obtained. Previously, high-speed bearing housings, that were used for floating or semi-floating bearings, had to be sand cast because many of the surfaces were not exposed to allow die casting. In sand casting with its inherit surface roughness, a considerable amount of machining had to take place. Basically, the new design of the bearing housing consists of slicing the bearing housing in half, with the part nearest the compressor forming the compressor housing portion 70 and the part adjacent to the turbine forming the turbine housing portion 71. Since the housing is now separated into two parts 70 and 71, there is no longer the necessity to leave the large opening for inserting a bearing in the housing. An oil cap housing or a seal cap housing can be cast integral with and as a part of the compressor housing portion 70. By casting the compressor housing portion 70, the housing for the seal 100 can be made integral therewith to eliminate a potential leakage path. The prior seal, which counteracted a vacuum caused by restrictions in upstream flow, was always a critical portion of prior assemblies. By reduction of the area of the opening, the seal becomes less critical. Also, die casting will reduce the cost of the oil seal by approximately half by eliminating the need for a cap ring and allowing the thrust of the semi-floating bearing to be taken by the compressor housing portion 70 and not the seal. One example of the new design of the bearing housing is shown in the preferred embodiment describing the use of the two part bearing housing with a turbocharger commonly used in farm tractors or small aircraft.

Another feature of the present invention involves the fact that the oil inlet passage 76 can always be located relatively close to the top of the bearing housing, with the oil discharge outlet 80 being located at the bottom. Assuming the present invention is used in a turbocharger, the turbine portion 10 has a fixed position determined by where the turbocharger can be connected to the exhaust system of the engine. The compressor section 9 also has a relatively fixed position determined by the most economic way to connect the annular discharge passage 14 with the intake system, thereby injecting compressed air in the cylinders of the engine. The position of the compressor housing portion 70, with respect to the compressor section 9, is fixed by the mounting holes 111, which bolts it to compressor section 9 and is sealed to prevent compressed air leakage by seal 115.

This leaves one major section, the turbine housing portion 71, that does not have a relatively fixed position. Since the turbine housing portion 71 is secured by flange 75 and clamp ring 34 to the turbine section 10, it can be freely rotated therewith before tightening into place. In the compressor housing portion 70, all of the holes 108 must contain bolts for holding the two halves 70 and 71 of the housing together. However, in the turbine housing portion, a total of twelve holes 107 are equally spaced for mating with three bolts through holes 108. This allows a total of twelve positions through which the turbine housing portion 71 may be rotated before being secured to a fixed position. In installing, all that has to be remembered is that the oil inlet passage 76 should be located as close to the top of the device as practical. An example of this is shown in FIGS. 7–10. Notice in all of these figures, the oil inlet is located at the top and the oil outlet is located at the bottom but the position of the turbocharger 8 has been changed. This allows the normal oil flow for lubrication and cooling by the force of gravity without the necessity of additional oil pumps, etc. In prior turbochargers, which is only one use of many for the present invention, a different bearing housing had to be used for different engines depending upon the position the turbocharger could be mounted upon the engine. This made for additional expense by the requirement of a large number of alternative parts.

The big cost savings of the two-part bearing housing is that it can now be die cast rather than sand molded at a tremendous reduction in total cost, because it has now eliminated the need for a lot of machining and cleaning after the casting operation. In a sand molded housing, internal coring of the passages is required. The die cast housing improves the reliability of the unit far beyond the previous sand casted units and the scrap rate goes way down. The area of the opening in the compressor housing portion 70 has been reduced to receive shaft 16, but not bearing 77. Thrust on bearing 77 is countered by housing portion 70 instead of the seal as was the case in prior designs. Because the surfaces of the housing are now fairly uniform, oil leakage is substantially eliminated. The finished product is lighter in weight, easier to machine (what few surfaces need machining), lower in price, cleaner, simpler, more reliable and easier to service.

Referring to servicing, if a turbocharger was used on a light aircraft, which is one of the uses of the design shown in the preferred embodiment incorporating the present invention, the bearing housing may be separated by taking the three bolts out of holes 107 and 108. The seal components could then be replaced rather than replacing the whole seal housing as was previously required. The oil seal near the compressor section 9 in the previously designed models was tremendously expensive because it had to be large enough to allow insertion of flange 86 of the bearing 77 and had to withstand the axial thrust on the bearing 77. Since the axial thrust is now supported by the compressor housing portion 70, a smaller seal 98 may be used. In field servicing, this seal 98 could be replaced (or any other seals that may be leaking) without the necessity of having to replace the entire seal housing as a unit. Also, if the bearing housing was defective due to wear or other conditions, it is possible to replace only half of the bearing housing.

It should be remembered that the present invention is used primarily with high speed bearings of the semi-floating type, wherein some type of axial thrust can be expected on the bearing. In the prior designs, the axial thrust was being taken by the oil seal housing, which was retained into position by a snap ring. The present design allows the axial thrust to be borne by the compressor housing portion 70, thereby substantially reducing the cost of the seal 98 adjacent the compressor portion 9. In the manufacture of turbochargers alone, the oil cap and seal assembly of the prior design was relatively high with respect to the overall cost. Now the seal 98 can be integral with the compressor housing portion 70, still the oil seals 98 may be replaced if necessary.

In the present design it should be remembered that it is easier to service, no special tools are required, and the design has no press fits in the housing.

What is claimed is:

1. A method of assembling a turbocharger for use on any given design of internal combustion engine, said turbocharger having a two part bearing housing for enclosing a semi-floating axial thrust type bearing, a first part of said bearing housing having a hole for receiving said bearing and a shaft therein, said first part having passages therethrough substantially perpendicular to said hole for allowing gravity flow of lubricant to said bearing and shaft, a second part of said two part bearing housing also having a hole to receive said bearing and said shaft and having a surface for counteracting axial thrust of said bearing, said method consisting of;
   a. positioning an exhaust turbine portion of said turbocharger in proper relationship for connection to an exhaust system of said engine;
   b. rotating said first part of said bearing housing in relation to said exhaust turbine portion to provide essentially vertical alignment of said lubricant passages for gravity flow of lubricant therethrough;
   c. positioning a compressor portion of said turbocharger in proper relationship for connection to the fuel intake of said engine;
   d. rotating said second part of said bearing housing for proper alignment with said compressor portion;
   e. rotationally adjusting said first part of said bearing housing for alignment with said second part of said bearing housing while maintaining gravity flow of lubricant through said lubricant passages;
   f. connecting said first part of said bearing housing to said second part of said bearing housing;
   g. connecting said first part to said exhaust turbine portion; and
   h. connecting said second part to saidcompressor portion.

2. The method of assembling a turbocharger as recitedin claim 1 includes after the step of positioning of said exhaust turbine position the additional step of mounting said exhaust turbine portion in said exhaust system, and after the step of connecting said second part to said compressor portion the additional step of mounting said compressor portion in said intake of said engine.

3. The method of assembling as recited in claim 2 includes after the last aforementioned step the additional step of connecting said lubricant passages to a lubricating system of said engine.

4. The method of assembling a turbocharger as recited in claim 1 includes after the positioning of said exhaust turbine portion the additional step of loosely connecting said first part to said exhaust turbine portion.

* * * * *